United States Patent [19]
Loring et al.

US005826064A

[11] Patent Number: 5,826,064
[45] Date of Patent: Oct. 20, 1998

[54] USER-CONFIGURABLE EARCON EVENT ENGINE

[75] Inventors: Keith Preston Loring, Coral Springs, Fla.; William Shaouy, Marietta, Ga.

[73] Assignee: International Business Machines Corp., Armonk, N.Y.

[21] Appl. No.: 681,776

[22] Filed: Jul. 29, 1996

[51] Int. Cl.[6] .............................. G06F 9/44; G06F 15/177
[52] U.S. Cl. ........................................... 395/500; 395/701
[58] Field of Search ...................................... 395/701, 500

[56] References Cited

U.S. PATENT DOCUMENTS

| | | |
|---|---|---|
| 5,093,914 | 3/1992 | Coplien et al. . |
| 5,265,248 | 11/1993 | Moulios et al. . |
| 5,286,908 | 2/1994 | Jungleib . |
| 5,303,388 | 4/1994 | Kreitman et al. . |
| 5,333,256 | 7/1994 | Green et al. . |
| 5,386,493 | 1/1995 | Degen et al. ........................... 395/2.76 |
| 5,388,264 | 2/1995 | Tobias, II et al. . |
| 5,390,138 | 2/1995 | Milne et al. . |
| 5,404,529 | 4/1995 | Chernikoff et al. . |
| 5,418,321 | 5/1995 | Keller et al. .............................. 84/606 |
| 5,469,508 | 11/1995 | Vallier ....................................... 381/63 |
| 5,615,296 | 3/1997 | Stanford et al. .......................... 395/2.1 |
| 5,668,996 | 9/1997 | Radinsky ................................. 395/681 |
| 5,715,318 | 2/1998 | Hill et al. ................................... 381/24 |

OTHER PUBLICATIONS

"CONVERTER FROM VISUAL CURVES TO AUDITORY CUES FOR BLIND PERSONS," IBM Technical Disclosure Bulletin, vol. 31, No. 12, May 1989, pp. 381–383.

"ARTIFICIAL INTELLIGENCE MULTIMEDIA PRESENTATION," IBM Technical Disclosure Bulletin, vol. 34, No. 10A, Mar. 1992, pp. 406–407.

Primary Examiner—Vincent N. Trans
Assistant Examiner—Ayni Mohamed
Attorney, Agent, or Firm—Kudirka & Jobse, LLP; Richard A. Tomlin

[57] ABSTRACT

A tool for providing user-configurable earcons, i.e. auditory cues, includes an earcon event engine responsive to command messages issued by tasks executing on a computer system. The command messages include an index to an earcon data file, which, in turn includes a reference to an audio file and audio parameter data for manipulating the acoustic parameters of the audio wave. A file interpreter provides the audio parameters to an audio processor for generation of the earcon. In one embodiment, the invention can be utilized with MIDI compatible instruments or sound cards.

18 Claims, 7 Drawing Sheets

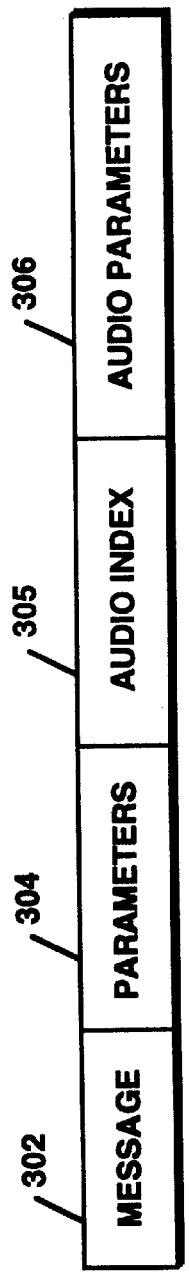
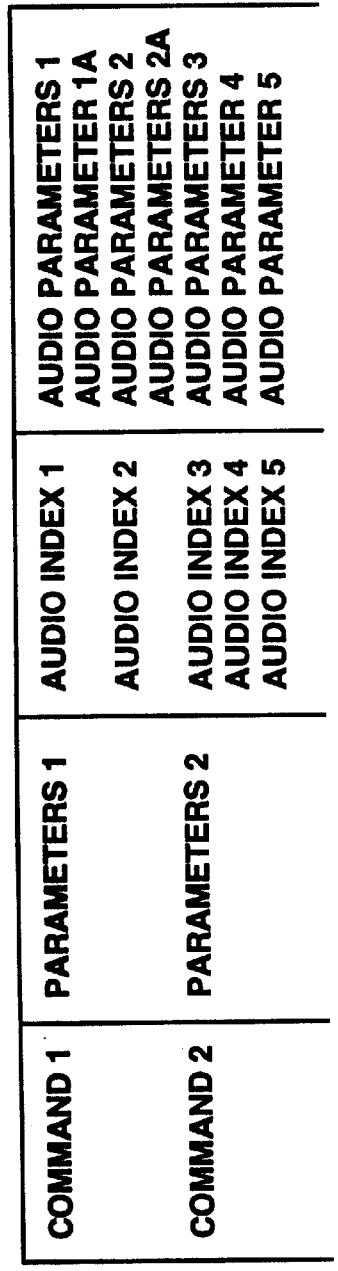
Figure 3A
Figure 3B
Figure 3C

USER-CONFIGURABLE EARCON EVENT ENGINE

FIELD OF THE INVENTION

The present invention relates, in general, to apparatus and methods for data processing, and in particular, to an invention for allowing users to customize the audio output of a computer system so as to provide meaningful information.

BACKGROUND OF THE INVENTION

Numerous advances have been made recently to simplify the manner in which users interact with computer systems. For example, graphic user interfaces (GUI) have been created to provide visually intuitive means of interacting with a computer. In particular, GUIs such as that available in the Workplace Shell, part of the OS/2® operating system, commercially available from IBM Corporation, Boca Raton, Fla., enable users to process and store data using graphic metaphors which resemble real life objects. One of the major components of these and other GUIs is the icon, i.e., a small graphical representation of a familiar object, typically implemented with a bit map, which represents an object, data or other resource available on the computer system. The work area or "desktop" of the GUI may contain multiple icons which are easily selected and manipulated by the user with a pointing device i.e., a mouse, pen, touch screen or even speech recognition software. Such interfaces have vastly reduced the level of sophistication and experience necessary for users to interact in a meaningful manner with the computer system and, accordingly, have increased user productivity.

Considerable advances have also been made in manner in which computers interact with the user's auditory sense, particularly in the fields of speech recognition and synthesis. However, most non-speech sounds generated by computers are still not useful. Early computers were incapable of generating sounds and therefore provided no useful sonic information to the user. With the advent of the personal computer (PC) first marketed by IBM Corporation, Armonk, N.Y., personal computers began to generate a series of sonically crude audio cues from an internal speaker. Such audio cues were typically coordinated with events such as power-up/down, inappropriate keystroke, and other system error information. More recently, advances in the sampling and storage of audio wave forms has allowed many real-world sounds to be stored and played back by the computer system in coordination with certain system events, typically under control of the operating system. Such sonic events or "earcons" are more interesting than the earlier rudimentary sounds generated by personal computers, however, their usefulness is still limited, typically, to notification of a discrete system event, such as power-up, power-down, opening a file, closing a file, etc.

Consequently, a need exists for a method and system for generating dynamically changing sonic events in synchronization with computer system events and subevents so as to provide meaningful feedback to the user about the status of the system.

SUMMARY OF THE INVENTION

The present invention, according to one embodiment, provides a computer useable media for use with a computer system including an audio processor. The medium contains computer program code, responsive to messages from task executing on the computer system, for selecting one of plural earcon files and for translating the selected earcon file into information capable of being used by the audio processor. The medium may further contain computer program code for creating and/or editing an earcon file. In another embodiment, an inventive method of configuring earcons in a computer system having an audio processor discloses the steps of selecting one of plural earcon files in response to a message from a task executing on the computer, and translating the selected earcon file into information useable by the audio processor.

In yet another embodiment of the invention, a user configurable earcon engine for use in a computer system having an audio processor contains apparatus, responsive to a message from a task executing on the computer system, for selecting one of plural earcon files and apparatus, responsive to the selected earcon file, for translating the selected earcon file into information useable by the audio processor.

BRIEF DESCRIPTION OF THE DRAWINGS

The above and other features, objects, and advantages of the invention will be better understood by referring to the following description in conjunction with the accompanying drawing in which:

FIGS. 3A–D are schematic representations the data structures associated with an earcon file and a data structure for storaging multiple earcon files;

DETAILED DESCRIPTION

Figure 1:
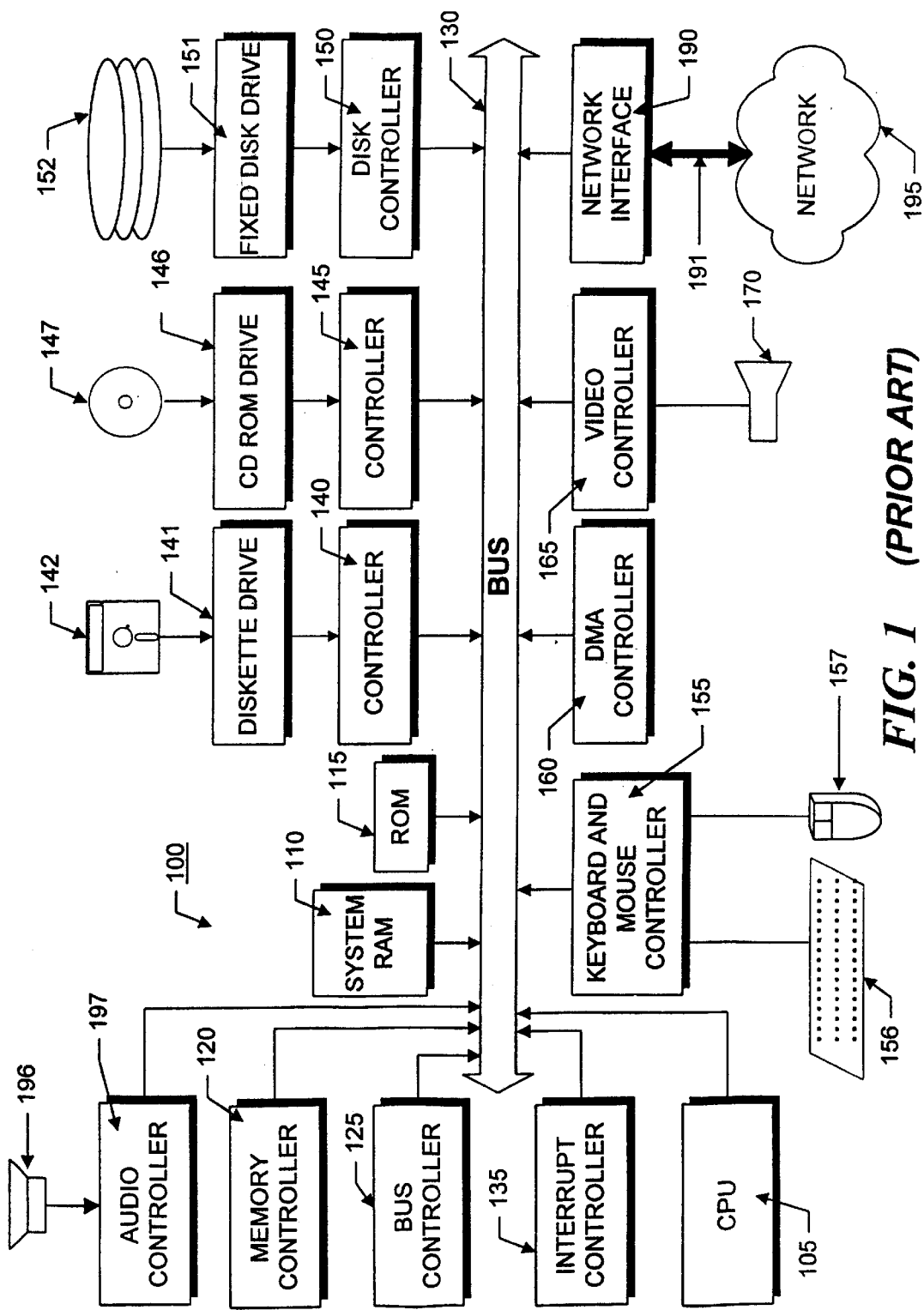
FIG. 1 is a block diagram of a computer system suitable for use with the present invention.

FIG. 1 illustrates the system architecture for a computer system 100, such as an IBM PS/2® computer on which the invention can be implemented. The exemplary computer system of FIG. 1 is for descriptive purposes only. Though the description below may refer to terms commonly used in describing particular computer systems, such as an IBM PS/2 computer, the description and concepts equally apply to other systems, including systems having architectures dissimilar to FIG. 1.

The computer system 100 includes a central processing unit (CPU) 105, which may include a conventional microprocessor, random access memory (RAM) 110 for temporary storage of information and read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components.

Mass storage may be provided by diskette 142, CD-ROM 147 or hard disk 152. Data and software may be exchanged with computer system 100 via removable media such as diskette 142 and CD-ROM 147. Diskette 142 is insertable into diskette drive 141, which is, in turn, connected to bus 130 by controller 140. Similarly, CD-ROM 147 is insertable into CD-ROM drive 146, which is connected to bus 130 by controller 145. Finally, hard disk 152 is part of a fixed disk drive 151, which is connected to bus 130 by controller 150.

User input to computer system 100 may be provided by a number of devices. For example, keyboard 156 and mouse 157 are connected to bus 130 by keyboard and mouse controller 155. An audio transducer 196, which may act as both a microphone and a speaker, is connected to bus 130 by audio controller 197, as illustrated. It will be obvious to those reasonably skilled in the art that other input devices such as a pen and/or tablet and a microphone for voice input may be connected to computer system 100 through bus 130 and an appropriate controller/software. DMA controller 160 is provided for performing direct memory access to system RAM 110. A visual display is generated by a video controller 165, which controls video display 170. Computer system 100 also includes a communications adapter 190 which allows the system to be interconnected to a local area network (LAN) or a wide area network (WAN), schematically illustrated by bus 191 and network 195.

Computer system 100 is generally controlled and coordinated by operating system software, such as the OS/2® operating system, available from the International Business Machines Corporation, Boca Raton, Fla. The operating system controls allocation of system resources and performs tasks such as process scheduling, memory management, and networking and I/O services, among other things.

Figure 2:
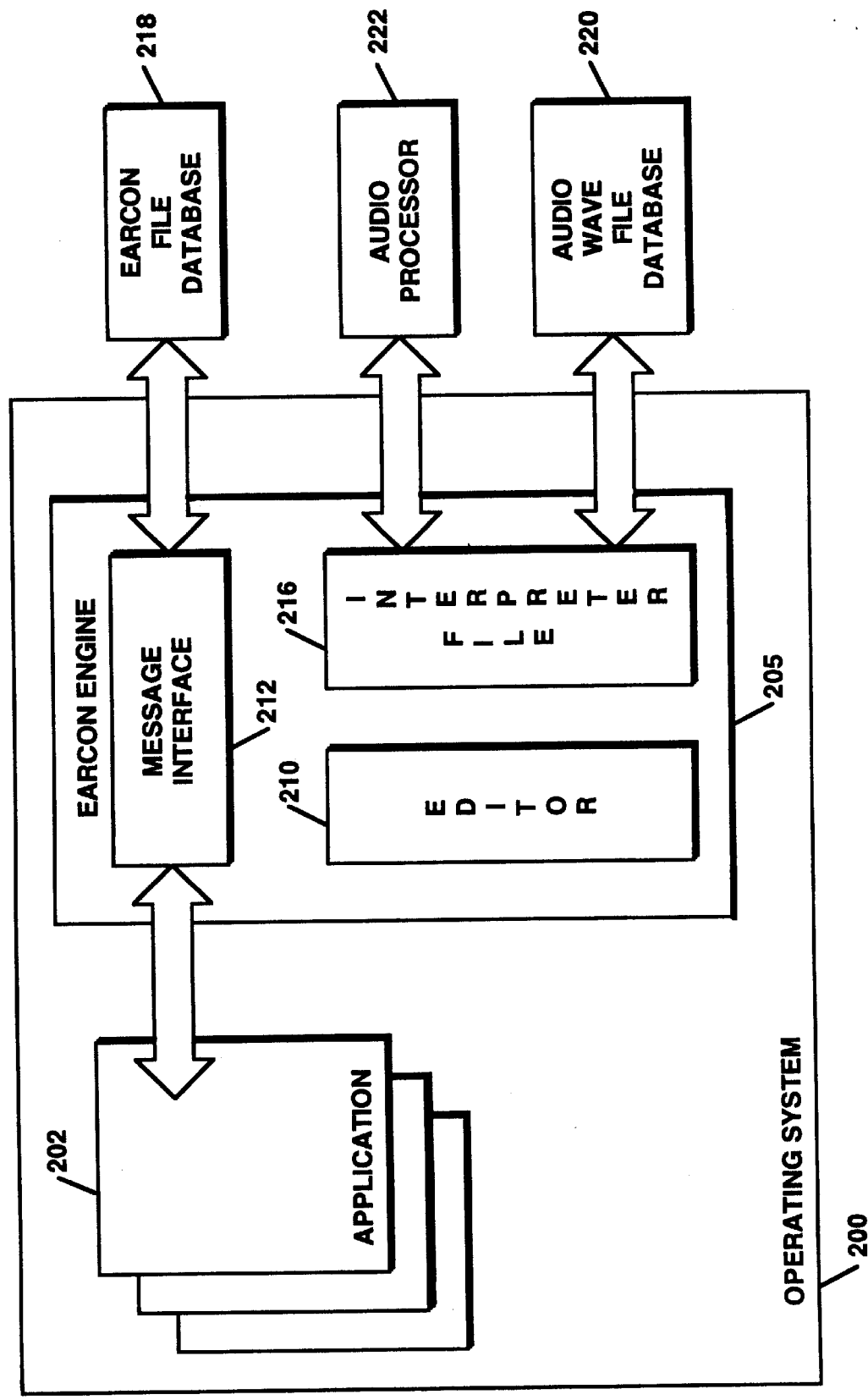
FIG. 2 is a schematic block diagram of the inventive earcon engine and its components in accordance with the present invention.

FIG. 2 illustrates schematically the inventive earcon engine and its components, as well as the other elements of the computer system with which the earcon engine interacts. In particular, operating system 200 resides in system memory and executes on the central processing unit. The present invention may be implemented with any number of commercially available operating systems including OS/2, UNIX, AIX, DOS, etc. One or more applications 202, such as word processors, spreadsheets, compilers, games, etc., are executed under the control of operating system 200. If operating system 200 is a true multitasking operating system, such as OS/2, multiple applications can be executing simultaneously.

Earcon engine 205 of the present invention interacts with operating system 200, applications 202, audio processor 222 and databases 218 and 220 in a manner described hereafter. Earcon engine 205 comprises earcon editor 210, message interface 212, and file interpreter 216. Earcon engine 205 may be implemented as a separately loadable application executing under the guidance of operating system 200, or, as in an integral part of the operating system itself, similar to the Multimedia Presentation Manager/2 utility which ships with the OS/2 operating system.

Before discussing the design and function of earcon engine 205, a description of the content and format of an earcon file is provided. A data structure for implementing a generic earcon data file 300 is illustrated in FIG. 3A. Earcon data file 300 comprises a message field 302, parameter fields 304, an audio index 305 and one or more audio parameters 306. Message field 302 may comprise an alphanumeric character string recognizable by the operating system and earcon engine 205, such as a specific system command, issued by tasks or applications executing on the operating system. Parameters 304 correspond to the parameters accompanying the command in message field 302 and may be implemented as long integers. Parameters 304 are used to specify a subevent such as the operation and the context of the operation.

Audio index 305 serves as a reference to the actual audio file associated with the event described by message 302 and parameters 304. Audio index 305 may be an index value or a pointer and may be implemented with a short or long integer value, or depending on the number of accessible files.

The audio file to which audio index 305 refers may be implemented in a number of formats, depending on the implementation of audio processor 222. For example, the audio file may be implemented as a digital sample of an audio waveform in accordance with the MIDI standard. In another embodiment, the audio file may be a .wav file, an industry recognized binary digital audio sample format, or other proprietary audio file format which is capable of being played by a conventional analog to digital converter. In yet another embodiment in which audio processor 222 contains either analog or digital sound synthesis circuitry such as oscillators, filters amplifiers, or dedicated digital signal processors the audio file may be implemented as a data file containing the selection parameters for the various circuit elements to facilitate generation of a sound. Audio parameters 306 comprise data for changing the acoustical properties of the audio file specified by index 305. Such parameters typically include information regarding the frequency, amplitude, duration and harmonic content, i.e., the pitch, loudness, timing and timbre, respectively, of a sound. Depending on the implementation of audio processor 222, the type and number of audio parameters 306 may vary accordingly. In the illustrative embodiment, audio processor 222 may be implemented with a musical instrument or sound card adhering to the Musical Instrument Design Interface (MIDI) standard. The MIDI standard is a protocol defined in publicly available specifications and is within the scope of knowledge of those skilled in the art. Accordingly, a description of the MIDI protocol, and an audio generating and/or processing system, such as audio processor 222, adhering to the MIDI protocol, will not be described hereinafter. In such an implementation, audio parameters 306 would have the format and number required by the MIDI protocol and supported by the instrument. Such MIDI parameters typically comprise audio sample mapping information, note on/off information, amplitude information and other parameters such as pressure or velocity sensitivity data for a keyboard instrument.

In implementations in which audio processor 222 does not adhere to the MIDI protocol but, instead, uses other audio circuitry, such as voltage controlled amplifiers, oscillators and filters, audio parameters 306 may comprise data representing control voltages to be supplied to the oscillators, amplifiers and filters, respectively, as well as a criteria for selecting the wave form output by the oscillator. If audio processor 222 comprises frequency modulated synthesis circuitry, audio parameters 306 may comprise data representing initial control values as well as carrier and program data and filtering values, as appropriate. In yet another implementation where audio processor 222 comprises merely digital to analog conversion circuitry, audio parameters 306 may comprise simply playback control data such as looping and/or sustain information for playback of a digital wave file in the .wav or other proprietary audio file format.

FIG. 3B illustrates an exemplary earcon datafile 310. Command field 302 contains the message WM_COMMAND. Parameters 304 are illustrated as comprising the WPARAM and LPARAM parameters accompanying the WM_COMMAND message which represent the subevent and context of the subevent, respectively. Audio index 305 and audio parameters 306 are represented by generic integer values in accordance with the above-described embodiment.

An earcon data file may contain a single or multiple commands. Further, an earcon file may contain multiple sequentials values for any of fields 302, 304, 305, 306, as indicated in exemplary audio earcon file 320 of FIG. 3C. In this manner, an earcon audio file may define a complex sonic event which has multiple subevents or "subearcons," associated with it. For example, a lengthy system operation may have a single earcon data file associated with the initial command message. However, within the earcon file, several successive commands, each with their own corresponding audio index and varying audio parameters may be present. In this manner, a system operation may be characterized by a sonic event or earcon whose acoustic parameters change continually as the system operation proceeds, or, by multiple sonic events or earcons, each of which may change dynamically. An illustrative example of such earcons is be described hereinafter with reference to FIGS. 6A–C.

Figure 3D:
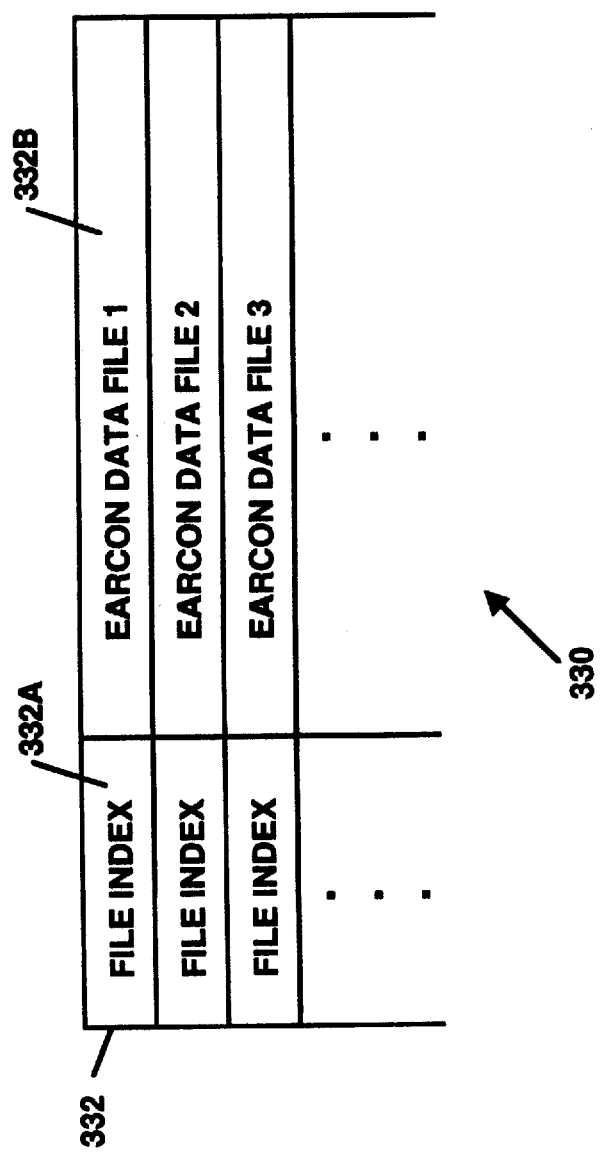

FIG. 3D illustrates one possible implementation of arrangement of earcon data files into an easily accessible format. In particular, a look-up table 330 comprises multiple entries 332, each having a file index field 332A and an earcon data file 332B associated therewith. Earcon data file 332B of each entry 332 may have the format of earcon files 300 or 320, as described previously. In the illustrative embodiment, each application as well as the operating system, may have its own look-up table similar to table 330, as illustrated. Such look-up tables, in turn, may be organized and accessible, typically with an indexing value, into an earcon data file array, illustrated as database 218, in a manner within the scope of those reasonably skilled in the arts. Such earcon file database may be stored in system RAM or in a storage device coupled to the computer system. The interaction of table 330 with message interface 212 and file interpreter 216 of earcon engine 205 will be explained subsequently with reference to FIG. 5.

Having described the format and content of an earcon data file in accordance with the present invention, the architecture and function of the earcon editor 210 is described with reference to FIG. 4. Earcon editor 210 may be implemented as a separately loadable application executable under the guidance of operating system 200 or as an integral part of earcon engine 205. In the illustrative embodiment, earcon editor 210 is an interactive program through which users can create new earcon files, modify existing earcon files, and save the earcon files to memory. The user interface of earcon editor 210 may be implemented with a simple single command line interface, such as a file editor, through which users input commands, respond to queries, and enter data. Alternatively, the user interface may comprise a more sophisticated graphic user interface.

Figure 4:
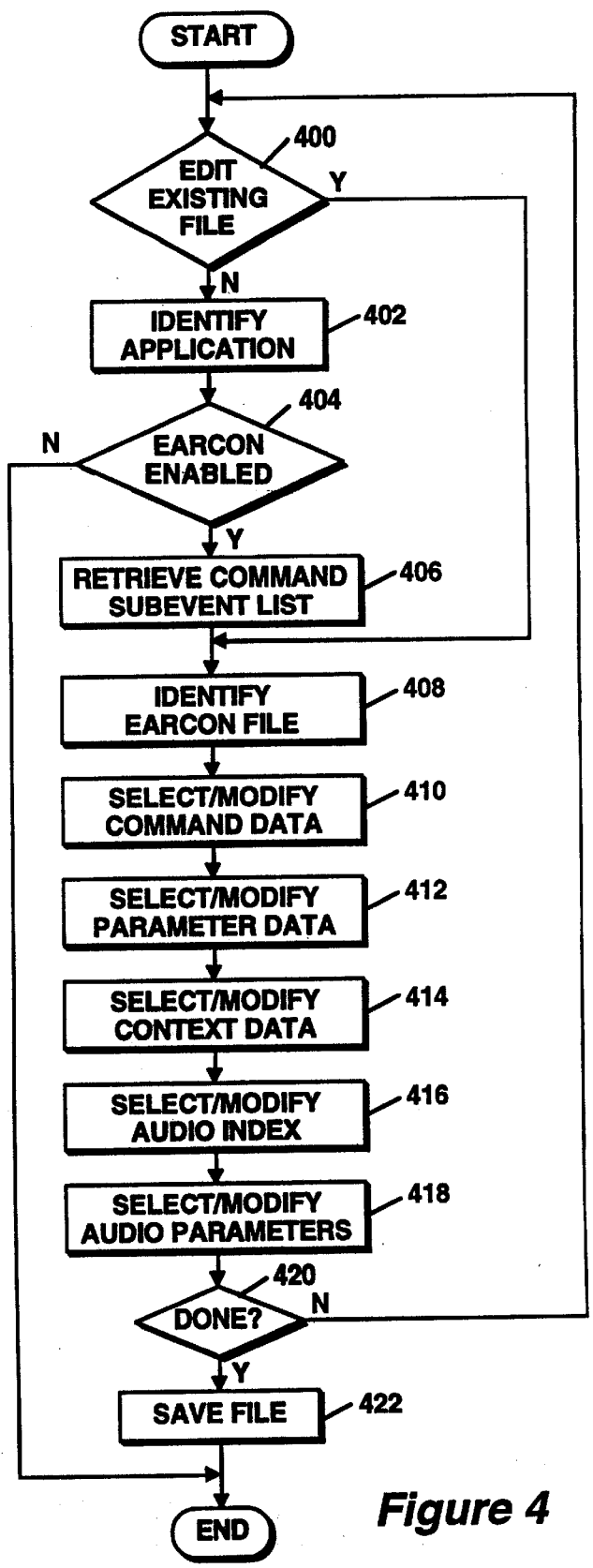
FIG. 4 is flow-chart illustrating the inventive method for creating and/or editing an earcon file.

Referring to FIG. 4, a flow chart of the inventive process for creating and/or editing an earcon file is illustrated. The process begins, following invocation, with the editor querying the user to either edit an existing file, or to create a new file, as indicated by decision block 400. If in decisional block 400 the user indicates editing of an existing earcon file, the process proceeds to block 408, if, however, the user desires to create a new file, the process proceeds to block 402 where the user identifies the task, i.e. application and/or operating system with which the earcon will be associated. Earcon editor 210 then searches a predefined list of earcon enabled applications and utilities for the identified application or, if not found, queries the application, typically through an application programming interface (API) as to whether the application is earcon enabled. For an application to be earcon enabled, the application developer may provide, typically in a separate file, a list of all the commands issued by the application and the corresponding parameters i.e., subevents and contexts possible with each command. If such a file exists, for the application, as determined in decision block 404, the inventive process proceeds to block 406 where the contents of the file are retrieved for use by earcon editor 210. Once the file containing the application commands, subevent and context data is retrieved, the file may be presented for browsing by the user. However, if such a file does not exist, the processes executed by the application cannot be identified appropriately by earcon engine 205 and "earconification" of the application processes is not possible. Accordingly the editing process terminates.

Next, in block 408, editor 210 queries the user to identify the earcon file. If the identified earcon file does not currently exist, earcon editor 210 creates a new earcon file and associates the file containing the command, subevent and context information of the earcon enabled application with the newly created earcon file. Also, if the user had answered affirmatively in decision block 400, process flow proceeds to block 408 in which identification of the earcon file would automatically have retrieved the appropriate file containing the command, subevent and context information of the earcon enabled application or operating system utility.

Next, editor 210 enables the user to select, enter and modify the command, subevent, context, audio index or audio parameter data within the earcon data file, as indicated by procedural blocks 410, 412, 414, 416, and 418, respectively. It will be obvious to those reasonably skilled in the art that the order in which the contents of the earcon data file may be edited does not have to follow the sequential order outlined in FIG. 4. In particular, editor 210 may be implemented so that the user may select, define or modify any one of the data items within the earcon file, in any order. Once the user has entered or modified the information within the earcon file, the user indicates that he/she is finished and the editor queries whether to save the current version of the file, as indicated in decisional block 420 and procedural block 422. If finished, the user may exit the earcon editor program or, alternatively, may return to decision block 400 as indicated, for further creation and/or editing of earcon files. The remaining implementation details necessary to create earcon editor 210 are within the understanding of those reasonably skilled in the arts and will not be described hereinafter for brevity purposes.

Having described the format and content of an earcon data file and the facility for creating such, the implementation and functionality of message interface 212, and file interpreter 216 of earcon engine 205 will be described with reference to FIGS. 2 and 5A–B. Message interface 212 comprises code for receiving and recognizing messages from earcon enabled applications and/or the operating systems. In addition, message interface 212 comprises code for parsing the received message to delineate the component elements of the message, as well as code for setting up temporary buffers in which to hold current value of the parsed message. The construction of such code elements, including the message parsing algorithms, will be understood by those reasonably skilled in the arts in light of the following description and FIG. 5. A message comprises at least a command, similar to command 302, command parameters, similar to parameters 304, and a file index, similar to file index 332A, all of FIG. 3. Upon receiving a message, message interface 212 parses the message for the file index. In addition to the parsing code, message interface 212 includes code which extracts the value of the file index contained within the message and uses the file index to access an entry in earcon file database 218. It will be obvious to those reasonably skilled in the arts that the code component of message interface 212 which utilizes the file index to enter an earcon file database will vary according to the actual implementation of the earcon file database.

As described previously, earcon file database 218 may comprise one or more look-up tables organized according to the applications or operating system functions with which the earcon files are associated. In one embodiment, the file index may be implemented within an integer or an ASCII character string which identifies both the application, i.e. page table, and the earcon file, i.e. page table entry, with which the message associated. If the file index is implemented with an integer, a portion of the integer value may be reserved for identification of the page table while the remaining digits are reserved for identification of the page table entry. If the file index is implemented with the ASCII character string, several characters may be similarly reserved for identification of a page table while the remaining characters may identify the page table entry. Once the appropriate earcon datafile has been identified, message interface 212 retrieves the earcon datafile and supplies the datafile to file interpreter 216, along with a copy of the original message from the application or operating system. In an alternative embodiment, message interface 212 may provide references, such as pointers or object pointers to file interpreter 216 which then retrieves the earcon data file or interprets the data directly from memory.

File interpreter 216 comprises code for interpreting the various fields within the earcon data file, as previously described with reference FIGS. 3A–C. In addition, depending on the implementation of audio processor 222, file interpreter 216 comprises code for retrieving an audio file using the audio index within the earcon data file, and, code for interpreting the audio parameters within the earcon data file. Specifically, file interpreter 216 first checks to see that the command and parameter values within indexed earcon file match those of the originally sent message. If so, file interpreter 216 uses the audio index to retrieve the audio file, which, as described previously, may be formatted as a .wav file, a digital sample according to the MIDI standard, or a data value representing a waveform generation criteria. Interpreter 216 responds to audio parameters 306, depending on the implementation and format of the data, and generates a series of audio processing calls or commands which are understood by audio processor 222. In the illustrative embodiment, where audio processor 222 is an instrument or sound card adhering to the MIDI standard, file interpreter 216 recognizes the MIDI commands and data in the audio parameters of the earcon data file and provides the same to audio processor 222.

In an alternative embodiment, file interpreter 216 may be capable of interpreting audio parameters having multiple data formats. In such an embodiment, audio processor 222 may be capable of .wav file playback, MIDI sample playback, and/or sound synthesis generation. Accordingly, file interpreter 216 would include code which, upon accessing the audio file, determines the format of the audio file, typically through a integer or ASCII value stored the file header, and selects the appropriate algorithm for processing the corresponding audio parameters within the earcon data file. In such an embodiment, a single earcon data file may contain data for generation of several earcons, some of which are created using different techniques, i.e, MIDI-based earcons mixed with synthesized earcons and wave file playback-type earcons.

In the illustrative embodiment, audio file database 222 of FIG. 2 comprises a plurality of audio files stored together to form a composite sound bank or database, and in a manner which is accessible by file interpreter 216. It will be obvious to those skilled in the art that audio file database 220 may be implemented as part of computer system 100 or any storage device coupled thereto. Alternatively, audio file database 220 may be resident within audio processor 222, i.e. tables of wave files or digital samples stored in either the ROM or RAM of a keyboard or sound card. As such, the audio file database may be updated separately and apart from the earcon data files in database 218.

Figure 5:
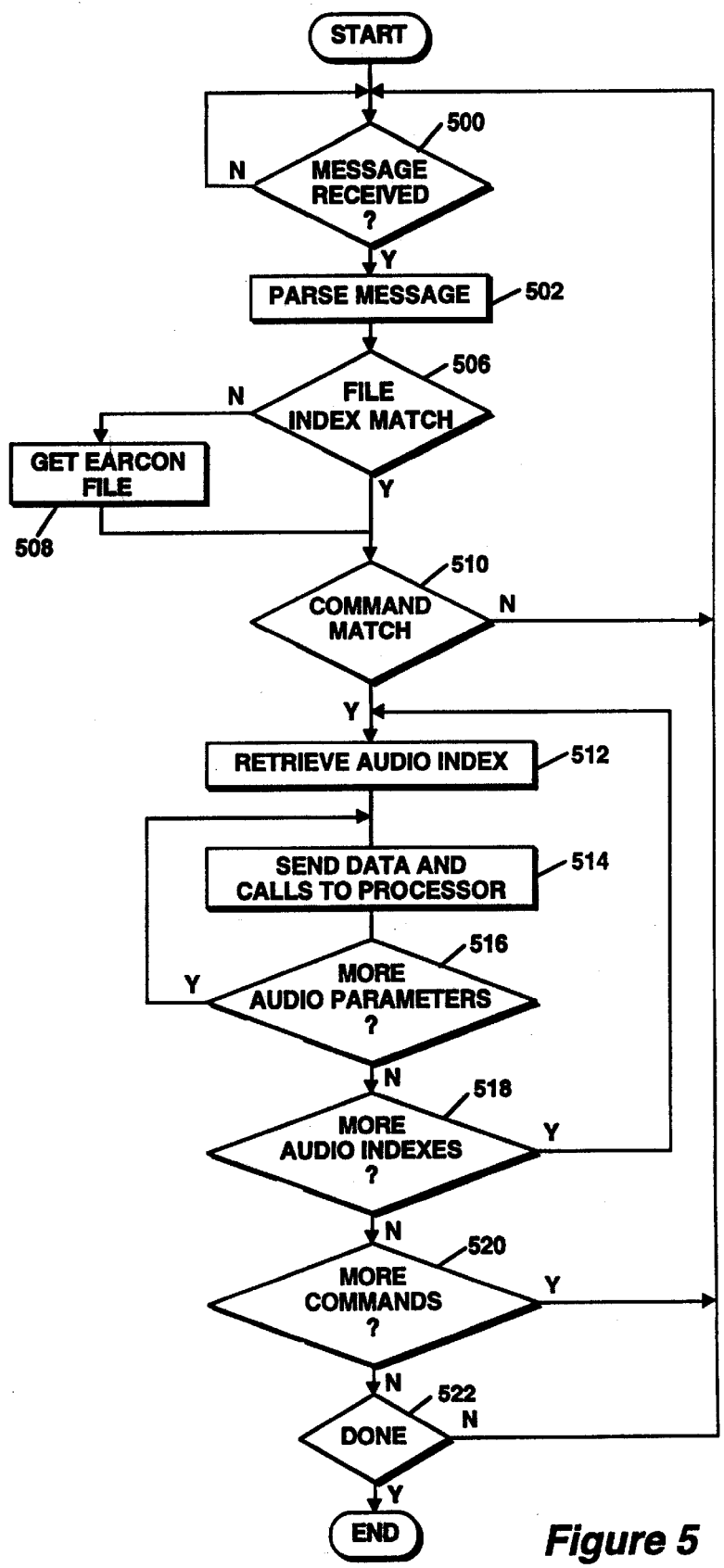
FIG. 5 is a flow-chart illustrating the inventive method for accessing and interpreting an earcon file.

FIG. 5 is a flowchart illustrating the inventive algorithm performed by earcon engine 205. Specifically, earcon engine 205 awaits a message from an earcon enabled application or from the operating system, as indicated by decisional block 500 of FIG. 5. Once a message is received, message interface 212 parses the message for a file index, as indicated by procedural block 502. Upon identifying the file index within received message, message interface 212 compares this new file index with the value of the file index most recently accessed with the last message, as indicated in decisional block 506. If the new file index does not match the most recently accessed file index in decisional block, message interface 212 retrieves the earcon file associated with the new file index, as indicated by procedural block 508. Following retrieval of the corresponding earcon file, or, if the new file index matches the most recently accessed file index, message interface 212 compares the command and parameters within the received message with those contained in the currently retrieved earcon file, as indicated by decisional block 510. If no match occurs, message interface 212 take no further action and waits for the next message, as illustrated in FIG. 5. If, however, the command and parameters in the earcon data file match the command and parameters contained in the message received, file interpreter 216 uses the audio index within the retrieved the earcon file to access the audio file, as indicated in procedural block 512. Once the audio file containing the data relating to the sound has been retrieved, file interpreter 216 interprets the audio parameters and, based on the format of the parameters, generates the appropriate procedure calls and supplies the relevant parameter data to audio processor 222, in a matter understood by those skilled in the arts, as indicated by procedural block 514.

File interpreter 216 searches for additional audio parameters associated with the audio index value, and, as appropriate, supplies the parameter data to and generates procedural calls for audio processor 222, as previously described, and as represented by blocks 514 and 516. Once processed, if no additional audio parameters are associated with the selected audio file, file interpreter 216 searches the earcon data file for additional audio indexes, as indicated by decisional block 518. If additional audio indexes are present within the earcon file, procedural flow returns to block 512 where the next audio index is used to retrieve the next audio file from the audio file database 220, as illustrated. If there are no further audio parameters or audio indexes associated with a particular command in the earcon data file, file interpreter 216 searches the earcon data file for additional command and parameter sets, as indicated by decisional block 520 of FIG. 5. If, within the earcon data file, there are additional command and parameter value sets, file interpreter 216 retains these values in a buffer, representing the most recently accessed command/parameter set, and, process flow returns to message interface 212 to await receipt of the command from the earcon enabled application. Upon receiving the next subsequent message, message interface 212 parses the message and compares the file index and command and parameter data just received with the command/parameter set in the buffer, as previously described, with reference to procedural blocks 500–510. In this manner, a single earcon data file may contain multiple commands, each command possibly having associated therewith multiple audio indexes, and each audio index possibly having associated therewith multiple set of audio parameters. File interpreter 216 generates the appropriate procedural calls to audio processor 222 only once the message associated with a particular command within an earcon datafile has been received. As such, a system procedure which generates several messages will generate several corresponding earcons only once those messages have been received and processed by earcon engine 205, as illustrated in greater detail by the following examples.

As described above, certain aspects of the invention relate to specific method functions implementable on computer system. Those skilled in the art should readily appreciate that program code defining such functions can be delivered to a computer in multiple forms including, but not limited to a (information permanently stored on non-writable storage media, e.g., optical, magnetic or semiconductor read only memory devices within a computer or readable by a computer; b) information alterably stored on a writable storage medium, e.g., removable disks and hard drives; or c) information conveyed to a computer through communications medium such as telephone and computer networks or even wireless transmission apparatus. It should be understood, therefore, that such mediums, when carrying the information representing the inventive method functions represent alternate embodiments of the present invention.

Figure 6A:
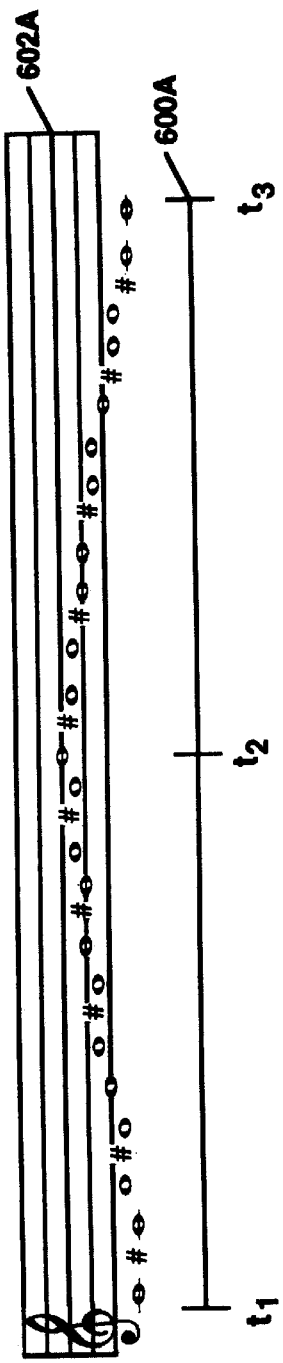
FIG. 6A–B illustrate exemplary earcons in accordance with the present invention.
Figure 6B:
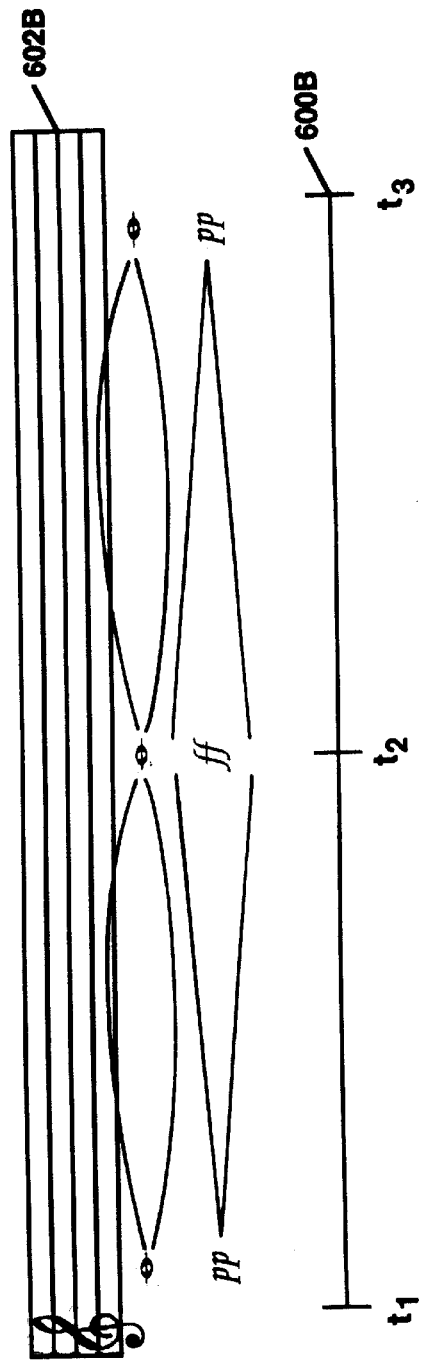

With reference to FIG. 6A–B, an exemplary system operation and a number of possible accompanying earcons in accordance with the illustrative embodiment of the invention are described. In the illustrative embodiment, sound files are not simply played back but may have their acoustic parameters modified dynamically during playback. Specifically, FIG. 6A illustrates a time line 600A and a musical staff 602A. An exemplary system operations, such as a lengthy downloading of a file would commence at time $t_1$, be approximately 50% completed at time $t_2$ and would terminate at $t_3$ as illustrated. The system utility executing the loading operations is assumed to be earcon enabled and would generate appropriate command messages at least at times $t_1$, $t_2$, and $t_3$. Using the earcon editor, as describe in the illustrative embodiment, a user can define an earcon data file to accompany the exemplary system operation and generate sounds meaningful to the user. In particular, as illustrated, musical staff 602 represents the G clef treble staff with a series of chromatically ascending and descending notes the correspond to the time necessary for completion of the exemplary system operation. In particular, the chromatic scale commences at time $t_1$ and ascends in pitch reaching the highest pitch at note time $t_2$, i.e. the climax of the melodic phrase, upon 50% completion of the exemplary operation. Thereafter, the chromatic scale descends in pitch, and reaches the original pitch upon completion of the task, at time $t_3$. In this manner, as the task executes the user hears a gradually ascending series of pitches which climaxes melodically half way through the operation and descend to the original pitch upon completion of the operation. Consequently, the user is supplied with a useful auditory stimuli as to the status of the operation without relying on a visual cue. To achieve this result, the user would generate an earcon file containing the command messages issued by the earcon enabled application performing the downloading operation. The file would specify a particular audio file and the audio parameter data representing the duration and pitches of the notes, as appropriate, to cause the chromatic ascension and descension, as illustrated, during the system operation.

As a second example, FIG. 6B illustrates the same by time line 600B characterizing the duration of the system operation. However, in this instance, the user has created an earcon file in which the pitch of a single note remains the same throughout the entire system operation. However, the amplitude or volume of the note changes dynamically to provide a meaningful auditory que to the user as to the status or progress of the system operation. Specifically, as illustrated with musical staff 602B, the note is indicated in musical dynamic terminology as double pianissimo, i.e., very soft, at time $t_1$ and increases in volume to a level indicated as double forte, i.e., very load, at time $t_2$. Thereafter the volume of the note decreases again to a pianissimo level at time $t_3$. In this example, the volume of the note provides an auditory indication as to the status of the system operation, versus the melodic pitch changes of the notes, as in the example with reference to FIG. 6A.

In an alternative example, the single note illustrated in the example of FIG. 6B, rather than of changing dynamically in volume may change dynamically in harmonic content. For example, particularly with implementations in which audio processor 222 utilizes sound generation circuitry including analog or digital low pass filters, the timbre or tone of the note at time $t_1$ could be dull or muted, as characterized by low harmonic content in a waveform and a low filter cut-off frequency setting. Thereafter the filter cut-off frequency and resulting waveform harmonic content increase gradually until time $t_2$, at which point the sound is much brighter, i.e. characterized by richer harmonic content within the wave form and a high filter cut-off frequency setting. Thereafter, the filter cut-off frequency gradually decreases, returning to its initial setting at time $t_3$, and resulting in the sound becoming progressively muted, as characterized by low harmonic content. In this example, neither the pitch nor the amplitude of the tone, but the actual harmonic content of the tone itself provides the user with an auditory cue as to be status of the system operation.

In an alternative example, the user may choose to change the harmonic content of a note by switching audio indexes to provide meaningful information to the user. In particular, in the example of FIG. 6B a note could be generated at time $t_1$ with a timbre similar a trumpet, and, at time $t_2$, the timbre may be switch to that of a piano or violin or any other timbre available in audio file database 220. In this example the change in instrumental timbre provides the auditory que to the user. It will be obvious to those reasonable skilled in the arts that non-periodic waveforms, such as white noise, pink noise, and atonal waveforms may also be utilized with the present invention, however the ability to modify the pitch of such waveforms may be limited or non existent.

For the sake of simplicity, the illustrative earcon examples have demonstrated changing of a single acoustic parameter of an earcon during the duration of the exemplary system operation. It will be obvious to those reasonably skilled in the arts that, given the illustrative embodiment of invention, multiple acoustic parameters of an earcon may change dynamically to provide even more meaningful, complex auditory cues. For example, with reference to FIG. 6A, the earcon associated with the system operations may be characterized by a sonic event in which the pitches of the notes ascend and descend chromatically, as previously described, however the amplitude and/or timbre of the notes may change alternately, or in some other pattern defined by the user.

In yet another embodiment of the invention, the audio index and audio parameters of an earcon data file may be replaced with a reference or pointer to a standard MIDI file. In this embodiment, in which audio processor 222 is a MIDI compatible instrument or sound card, the sonic complexity of the earcon is limited only by the facilities of the audio processor and/or the MIDI editor/sequence used to create the MIDI file. For example, the resulting earcon may be polyphonic, i.e. many notes simultaneously, multimbral i.e. many timbres simultaneously, and signal processed to provide effects such as reverberation and stereo panning. In such an implementation, the earcon associated with an application or operating system event may be as sonically interesting as any musical composition capable of being generated with a MIDI editor/sequencer. The construction and function of a MIDI editor/sequencer used to generate such a MIDI file are well known in the arts and within the scope of those reasonably skilled.

While the invention has been described in terms often illustrative embodiment in a specific system environment, those skilled in the art recognized that the invention can be practiced, with modification, in other different hardware and software environments within the spirit and scope of the appended claim. For example in some computer system in which the audio processor does not contain a dedicated signal processor, many of the computations associated with generation of sound may be performed by the general purpose processor with the central processing unit. File interpreter 216 would then direct data and procedural calls to the general processor or audio processor 222, as appropriate.

What is claimed is:

1. A computer program product for use with a computer system, the computer system capable of executing one or more tasks thereon and having an audio processor for generating sounds, the computer program product comprising:

a computer usable medium having embodied in the medium program code means for causing the audio processor to generate sound in response to execution of a task on the computer system, the program code means comprising:

program code means, responsive to a reference to an earcon file generated by the task, for accessing the earcon file, the referenced earcon file comprising an audio waveform identifier and audio parameter data for modifying the identified audio waveform; and program code means responsive to the selected earcon file for causing the audio processor to generate sound.

2. The computer program product of claim 1 wherein the program code means responsive to the selected earcon file further comprises:

program code means for selectively supplying the audio parameter data to the audio processor.

3. The computer program product of claim 2 wherein the referenced earcon file further comprises:

at least one task command and wherein the audio parameter data is supplied to the audio processor in response to the task issuing the command.

4. The computer program of claim 3 wherein the referenced earcon file comprises multiple commands, each of the commands having associated therewith audio parameter data.

5. The computer program product of claim 1 wherein the program code means further comprises:

program code means for creating and modifying earcon files.

6. The computer program product of claim 1 wherein the program code means further comprises:

program code means for storing a plurality of earcon files.

7. The computer program product of claim 6 wherein said program code means for storing further comprises:

program code means for associating each of the plurality of earcon files with a task executable on the computer system.

8. In a computer system capable of executing one or more tasks and having a memory and an audio processor for generating sounds, a method for causing the audio processor to generate sound in response to execution of a task, the method comprising the steps of:

A. providing at least one earcon file stored in the memory, the earcon file comprising an audio waveform identifier and audio parameter data for modifying the identified audio waveform;

B. accessing the earcon file in response to a reference to the earcon file generated by a task executing on the computer system; and C. supplying the referenced earcon file to the audio processor for generating sound.

9. The method of claim 8 wherein step B comprises the steps of:

B1. selecting the audio waveform identified by the earcon file; and

B2. supplying the identified audio waveform and the audio parameter data to the audio processor.

10. The method of claim 8 further comprising step of:

C. creating an earcon file, the earcon being associated with a task executable on the computer system.

11. In a computer system, apparatus for generating sounds in conjunction with execution of a task on the computer system, the apparatus comprising:

a processor;

a first memory, coupled to the processor, for storing a plurality of tasks executable on the processor, the task capable of generating command messages;

an audio processor capable of generating sounds;

a second memory for storing a plurality of earcon files;

a third memory for storing a plurality of audio files;

means, responsive to a command message generated by one of the tasks executing on the processor, for selecting one of the plurality of the files; and means, responsive to the selected earcon file, for causing the audio processor to generate sound in response to issuance of the command message by the task; and means, responsive to user commands for creating and modifying an earcon file.

12. The apparatus of claim 11 wherein the means responsive to the selected earcon file further comprises:

means for selecting one of the plurality of audio files and for supplying the audio files to the audio processor.

13. The apparatus of claim 11 wherein the earcon file further comprises audio parameter data useful to the audio processor for generating an audio waveform.

14. In a computer system, apparatus for generating sounds in conjunction with execution of a task on the computer system, the apparatus comprising:

a processor;

a first memory, coupled to the processor, for storing a plurality of tasks executable on the processor, selected of the tasks capable of generating command messages, the command messages containing a reference to an earcon file;

an audio processor capable of generating sounds;

a second memory for storing a plurality of earcon files, selected of the earcon files comprising an audio waveform identifier and audio parameter data for modifying the identified audio waveform;

a third memory for storing a plurality of audio waveforms;

means, responsive to a reference to one of the earcon files generated by one of the tasks executing on the processor, for accessing the referenced earcon file; and means, responsive to the selected earcon file, for causing the audio processor to generate sound in response to issuance of a command message containing the reference to said earcon file.

15. The apparatus of claim 14 wherein the means for causing the audio processor to generate sound further comprises:

means for selecting one of the plurality of audio waveforms stored in the third memory with the audio wave form identifier, and for supplying the selected audio waveform to the audio processor.

16. The apparatus of claim 14 wherein the referenced earcon file further comprises:

at least one task command and wherein the audio parameter data is supplied to the audio processor in response to the task issuing the command.

17. The apparatus of claim 16 wherein the referenced earcon file contains multiple task commands, each of the commands having associated therewith audio parameter data.

18. The apparatus of claim 14 further comprising:

means, responsive to user commands, for creating and modifying earcon files.

\* \* \* \* \*